(12) United States Patent
Chien et al.

(10) Patent No.: US 7,714,965 B2
(45) Date of Patent: May 11, 2010

(54) METHOD OF PLASMA BEAM BOMBARDMENT OF ALIGNING FILMS FOR LIQUID CRYSTALS

(75) Inventors: Liang-Chy Chien, Hudson, OH (US); Andriy Dobrovolskyy, Kyiv (UA); Oleg Yaroshchuk, Kyiv (UA); Oleg Lavrentovich, Kent, OH (US)

(73) Assignee: Kent State University, Kent, OH (US)

( * ) Notice: Subject to any disclaimer, the term of this patent is extended or adjusted under 35 U.S.C. 154(b) by 498 days.

(21) Appl. No.: 10/553,326

(22) PCT Filed: May 17, 2004

(86) PCT No.: PCT/US2004/015411

§ 371 (c)(1),
(2), (4) Date: Oct. 14, 2005

(87) PCT Pub. No.: WO2004/104682

PCT Pub. Date: Dec. 2, 2004

(65) Prior Publication Data

US 2006/0209241 A1  Sep. 21, 2006

(51) Int. Cl.
*G02F 1/1337* (2006.01)
(52) U.S. Cl. .......... 349/124; 349/125
(58) Field of Classification Search .......... 349/123, 349/124, 125, 187, 130, 136; 428/1.2; 430/321; 250/423 F, 426; 313/362.1; 315/111.21, 315/111.91
See application file for complete search history.

(56) References Cited

U.S. PATENT DOCUMENTS

| | | | | |
|---|---|---|---|---|
| 4,261,650 A | * | 4/1981 | Sprokel | 349/125 |
| 5,945,781 A | * | 8/1999 | Valentian | 315/111.81 |
| 5,973,447 A | | 10/1999 | Daniels et al. | |
| 6,020,946 A | * | 2/2000 | Callegari et al. | 349/124 |
| 6,124,914 A | * | 9/2000 | Chaudhari et al. | 349/129 |
| 6,195,146 B1 | | 2/2001 | Chaudhari et al. | |

(Continued)

FOREIGN PATENT DOCUMENTS

JP  07056172  3/1995

(Continued)

OTHER PUBLICATIONS

O. Yaroshchuk, Yu. Zakrevskyy, A. Dobrovolskyy, S. Pavlov, *Liquid Crystal Alignment on the Polymer Substrates Irradiated by Plasma Beam*. Proc. of SPIE, vol. 4418, 49-53 (2001).

(Continued)

*Primary Examiner*—Dung Nguyen
*Assistant Examiner*—Tai Duong
(74) *Attorney, Agent, or Firm*—Hudak, Shunk & Farine Co. LPA

(57) ABSTRACT

Methods for treating aligning substrates produces uniform alignment of liquid crystals in at least two modes. The method is based on the treatment of liquid crystal aligning substrates with a collimated or partially collimated plasma beam. In one embodiment, the method comprises a step of bombarding an aligning substrate with at least one plasma beam from a plasma beam source at a designated incident angle to align the atomic/molecular structure or the surface profile of the aligning substrate in at least one aligned direction.

35 Claims, 11 Drawing Sheets

U.S. PATENT DOCUMENTS 6,426,786 B1 * 7/2002 Lu et al. .................. 349/125
2002/0186336 A1 12/2002 Chaudhari et al.

FOREIGN PATENT DOCUMENTS

JP 09230351 9/1997
JP 09281499 10/1997

OTHER PUBLICATIONS

O. Yaroshchuk, Yu. Zakrevskyy, A. Dobrovolskyy, S. Pavlov, *Polymer Films Treated with Plasma Bean as Aligning Substrates for Liquid Crystals*, Asia Display/IDW, 73-76 (2001).

O. Yaroshchuk, R. Kravchuk, A. Dobrovolskyy, S. Pavlov, *P-14: Plasma Treatment as a Method of In-Plane LC Alignment*, Eurodisplay, 421-424 (2002).

* cited by examiner

Plasma sheet

Substrate

Plasma sheet

Substrate

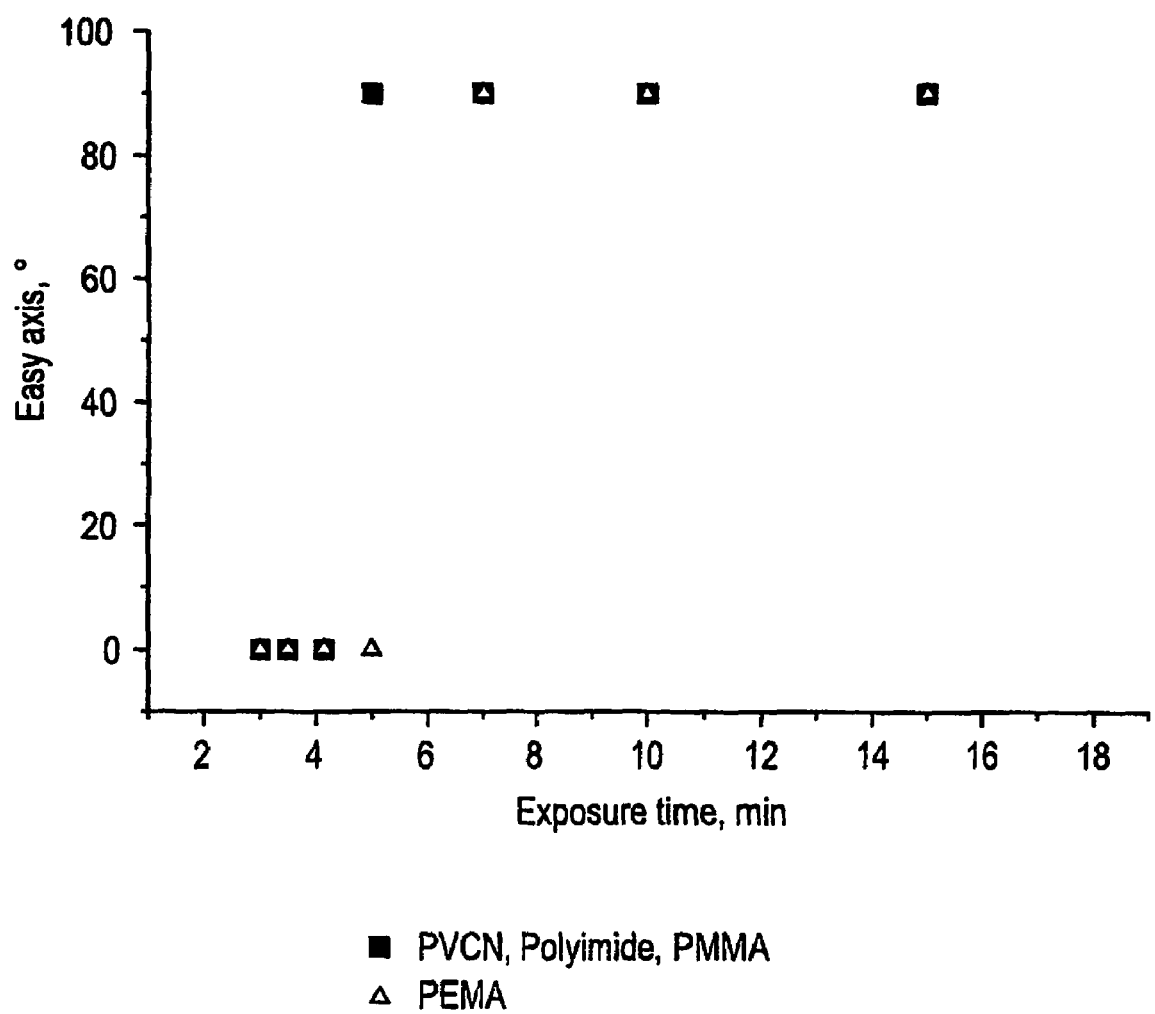

FIG. 10A
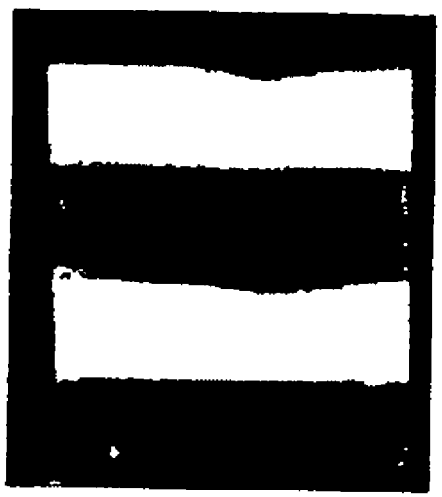
FIG. 10B
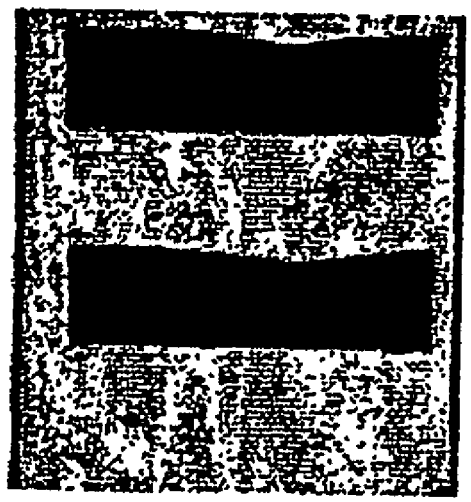
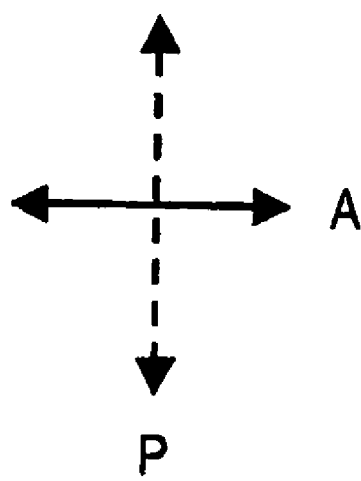
A
P
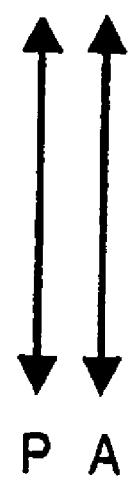
P   A

US 7,714,965 B2

METHOD OF PLASMA BEAM BOMBARDMENT OF ALIGNING FILMS FOR LIQUID CRYSTALS

FIELD OF INVENTION

The present invention relates to methods of uniform alignment of liquid crystals (LCs) of both thermotropic (solvent-independent) and lyotropic (solvent-based) type. More particularly, this method is based on the treatment of LC aligning substrates with a collimated or partially collimated plasma beam. In one embodiment, the method comprises the step of bombarding an aligning substrate with at least one plasma beam from a plasma beam source such as a closed drift thruster, preferably an anode layer thruster, at a designated incident angle to align the atomic/molecular structure and/or the surface profile of the aligning substrate in at least one aligned direction. The method can be used to produce at least two modes of uniform alignment, one mode with the "easy axis" in the incident plane of plasma beam, and a second mode with the "easy axis" perpendicular to the plane of incidence.

BACKGROUND OF THE INVENTION

A uniform surface alignment of liquid crystals (LCs) is an important problem in practical applications of liquid crystal cells. In the case of uniform alignment, the direction of the average orientation of LC molecules on the substrate can be described by two angles—zenithal angle $\theta$ (the angle between the substrate and the direction of LC average orientation, also called the pretilt angle of the LC, and the azimuth angle $\phi$ (the angle in the plane of the substrate, measured between the director and some axis). In absence of external torques, the two angles have well-defined equilibrium values or range of values that are determined by the specifics of molecular interactions at the liquid crystal-substrate interface. These equilibrium values determine one, two, or more "easy axis" or "easy axes" directions. The angle $\theta$ can be used to classify the types of uniform alignment of LC. Three cases can be cited:

1) homeotropic (also known as perpendicular or normal) alignment characterized by preferential orientation of LC molecules in a direction normal to the film. In this case LC pretilt angle $\theta$ is equal to 90°.

2) planar alignment characterized by uniaxial ordering of LC molecules in plane of the aligning substrate ($\theta$ equals 0).

3) tilted alignment with the orientation axis obliquely oriented with respect to the aligning substrate. For this type of alignment $0° < \theta < 90°$.

The first type of alignment implies that the azimuth angle $\phi$ is not specified, whereas 2) and 3) types are characterized by a well-defined value of the azimuth angle $\phi$, when the medium adjacent to the LC is anisotropic. The azimuth direction might be degenerate, i.e., $\phi$ is not specified, when the adjacent medium is isotropic in the film plane.

As, a rule, homeotropic alignment of LC can be relatively easy obtained for both thermotropic and lyotropic LCs. Thermotropic materials acquire their mesomorphic (orientationally ordered) state when the material is within a certain temperature range. Lyotropic materials become mesomorphic when dissolved in some solvent (such as water), within an appropriate concentration range. The most common method of homeotropic alignment is a treatment of the aligning substrates with surfactant materials. In contrast, great skill is required to obtain planar or tilted alignment with desirable alignment parameters such as the azimuth angle $\phi$, strength of anchoring, etc. The problem is challenging for both thermotropic and lyotropic LCs. The most common technique for such a controlled alignment is a unidirectional rubbing of special aligning films (e.g., polymer films) deposited at the bounding substrates. However, this method often hinders the further improvement of the devices based on LC cells because of several principal drawbacks. The rubbing process causes surface deterioration as well as generation of electrostatic charges and dust on the aligning surfaces. Besides, it is not convenient for the fabrication of LC cells having some special structure, for example, multidomain cells. The reason is that the rubbing method implies mechanical contact with aligning substrates.

To avoid the problem, a number of non-contact LC alignment methods has been suggested. Among them the photoalignment method is the most promising and intensively studied. Using this method, substrates are covered by photosensitive materials and subsequently irradiated with polarized UV or visible light. The photoalignment method allows controlling of LC anchoring and easy axis direction in both azimuthal and polar planes. This makes possible patterned alignment used to enhance viewing angles in nematic LCD. However, the photoaligning technique is usually accompanied with a low anchoring strength and relatively poor photo and thermal stability. Besides, LC alignment on the photoirradiated substrates is characterized by the pronounced image sticking effect which is a residual image when the controlling voltage is changed.

From the first sight, the main problem of photoalignment is a problem of useful materials. However, following literature data, practically all photoaligning materials developed up to this date more or less suffer from the drawbacks mentioned above. This gives the reasons to conclude that shortcomings of photoalignment are mainly associated with treatment procedure. As we believe, the action of UV/Vis light modifies the aligning surface only "softly" and so it is not capable to create strong boundary conditions for LC layers.

To overcome shortcomings of the conventional photoalignment method, M. Hazegava suggested to use deep UV irradiation. He showed that 257 nm irradiation causes LC alignment effect on the polymers, which are non-sensitive to conventional UVis light. One more radical solution is suggested by Chaudhari et al. It consists in oblique irradiation of the aligning polymer substrates with a collimated or partially collimated ion beam. This method provides excellent LC alignment on both organic and non-organic substrates. Later on, several modifications of the ion treatment method have been suggested. In the aligning substrate is bombarded with ions at normal incidence in the presence of an electric field, which is applied in the area close to the substrate. In this case the applied field is sufficient to redirect ions obliquely to the substrate. The other modification is proposed in where ion beam irradiation is used in combination with rubbing to produce two-domain patterning of the aligning substrate.

The advantages of deep UV irradiation and ion irradiation can be combined by the treatment of the aligning substrates with various kinds of plasma. The processing of LC substrates with the glow discharge was earlier applied for surface etching, grafting of the aligning surfaces with various atoms, as well as plasma polymerization. In comparison to prior art plasma methods that include deposition of various films [J. C. Dubois, M. Gazard, and A. Zann, 1974, *Appl. Phys. Letters*, 24(7), 29738-40; R. Watanabe, T. Nakano, T. Satoh, H. Hatoh, and Y. Ohki, 1987, *Jpn. J. Appl. Phys.*, 26(3), 373, and A. I. Vangonen, and E. A. Konshina. 1997, *Mol. Cryst. Liq. Cryst.*, 304, 507] and post-deposition treatments, mainly by bombardment with reactive ions [N. Shahidzadeh, A. Merdas, and W. Urbach, 1998, Langmuir, 14, 6594, 41-43; J. G. Fonseca, P. Charue, and Y. Galerne, 1999, *Mol. Cryst. Liq. Cryst.*, 329, 597; and S. P. Kurchatkin, N. A. Muravyeva, A. L. Mamaev, V. P. Sevostyanov, and E. I. Smirnova, Patent of Russia No 2,055,384.], the technique of the present invention has a number of advantages. All the previously known methods listed above are reportedly capable of producing various values of zenithal anchoring coefficient and pretilt angle but not a uniform planar alignment; mostly because the substrates are placed in the gas discharge area where the plasma treatment is practically isotropic. Sprokel et al. [G. J. Sprokel and R. M. Gibson, 1977, *J. Electrochem. Soc.*, 124(4), 559] proposed a directed plasma flux and anisotropic treatment, which resulted in a uniform planar alignment. This was achieved by the use of a modified r.f. plasma etcher in which reactive plasma was extracted and carried onto substrates by the gas stream. The technique of alignment set forth in this invention is extremely versatile, as it allows one to align both the thermotropic LCs such as the ones used in LC displays and lyotropic LCs, such as lyotropic chromonic LCs used in optical elements and biological sensors, see C. Woolverton et al., U.S. Pat. No. 6,171,802; O. D. Lavrentovich and T. Ishikawa, U.S. Pat. No. 6,411,354 and O. D. Lavrentovich and T. Ishikawa, U.S. Pat. No. 6,570,632. Moreover, all these liquid crystalline materials can be aligned at a broad variety of substrates, both inorganic and organic.

SUMMARY OF THE INVENTION

The present invention provides aligning substrates for uniform alignment of liquid crystals (planar, tilted and homeotropic) comprising organic and non-organic films treated with a collimated or partially collimated plasma beam, from a plasma source which is preferably an anode layer thruster.

The present invention also provides a method of making an aligning substrate comprising: providing an aligning substrate or film and irradiating or bombarding it with a collimated or partially collimated plasma beam.

The plasma beam irradiation method of the present invention results in at least two modes or types of uniform alignment when the irradiation is performed at tilted incident angles: (1) an easy axis that is confined to the incident plane formed by the direction of the beam and the normal to the treated substrate; (2), an easy axis that is perpendicular to the plane of incidence. By increasing the irradiation dose one can change the alignment direction from the type (1) towards the type (2). In the first type of alignment, the value of the pretilt angle can be controlled, wherein pretilt angle θ is 0° to less than or equal to 10° for LC with positive dielectric anisotropy ($\Delta\epsilon > 0$) and 0° to less than or equal to about 40° for LC with negative dielectric anisotropy ($\Delta\epsilon < 0$), with irradiation parameters (irradiation angle, ion current density, ion energy, etc.). The second type of alignment is characterized by a zero pretilt. Two-mode alignment feature can also be used to generate alignment with desirable parameters as well as to pattern LC cell(s).

The present invention also provides a class of plasma sources which can be used to generate uniform LC alignment. As an example of suitable plasma source, the anode layer thruster is disclosed. In our experiments of the present invention, plasma is extracted and accelerated electrostatically to relatively low energies that treat only a thin layer of the substrate. Thus the anode layer thruster plasma source allows one to combine the advantageous anisotropic treatment with collimated or partially collimated plasma fluxes and the optimized energies of ions. The anode layer thruster plasma source can be scaled up to treat substrates of large size (meters). Reliability, simplicity of construction, high thrust efficiency and easiness of treatment of substrates make this source attractive for technological applications.

One of the main advantages of the described procedure is that it yields several regimes of LC alignment, as specified below for the typical thermotropic LC materials such as nematic LC K15 pentylcyanobiphenyl (5CB):

1) First mode which is usually characterized by planar alignment with a relatively weak azimuthal anchoring coefficient $W_a = 10^{-6} - 10^{-5}$ J/m² or higher and relatively high pretilt angle θ=(about 5°-about 10°) for LC with $\Delta\epsilon > 0$ and θ=(about 5° to about 40°) for LC with ($\Delta\epsilon < 0$);

2) Second mode which is characterized by planar alignment with relatively strong anchoring ($W_a > 10^{-4}$ J/m²) and zero pretilt angle; and 3) Subsequent treatment using the combinations of the basic two modes above which is characterized by, planar alignment with strong anchoring ($W_a > 10^{-4}$ J/m²) and moderate pretilt angle θ=(0°-about 5°).

Each of these regimes is attractive for modern LCD technologies in which the thermotropic LCs are used. The first alignment regime may be useful for LCD based on the easy axis gliding. The second regime is promising for bistable nematic displays. Finally, the third regime and, possibly, the first regime for some aligning materials may replace standard rubbing procedure widely used in modern LCD technology. The regimes above are also of practical importance in aligning lyotropic LC such as lyotropic chromonic liquid crystals (LCLCs) that can be used in optical and sensing applications, see C. Woolverton et al., U.S. Pat. No. 6,171,802; O. D. Lavrentovich and T. Ishikawa, U.S. Pat. No. 6,411,354 and O. D. Lavrentovich and T. Ishikawa, U.S. Pat. No. 6,570,632 herein incorporated by reference.

The two-mode alignment opens new opportunities for the patterning of LC alignment. For instance, the two-domain azimuthal patterning can be realized by only one masking step without any rotation of the substrate. Evidently, all patterning procedures described for other etching alignment methods are also feasible in the present invention. Moreover, for sample patterning, the plasma alignment method may be combined with other methods of LC alignment.

Finally, it is worth mentioning that the proposed aligning procedure is compatible with other vacuum processes employed in LCD industry, including but not limited to, ITO deposition, TFT coating, vacuum filling of LCD, etc. An entirely vacuum technological line of LCD production is envisioned which can strongly reduce the well-known problems related to dust, humidity, air ions etc.

BRIEF DESCRIPTION OF THE DRAWINGS

The invention will be better understood and other features and advantages will become apparent by reading the detailed description of the invention, taken together with the drawings, wherein:

FIG. 3b presents the azimuth angle of the direction of LC alignment as a function of current density of $Ar^+$ ions, starting from the direction of the incident plasma plane designated as 0° and rotate either clockwise or counterclockwise to 90° for the cells shown in FIG. 3a.

FIG. 4 presents azimuth angles of the direction of LC alignment as a function of irradiation time for the following plasma treated aligning substrates: PVCN, PI (polyimide), PMMA (polymethyl methacrylate) (square), PEMA (polyethyl methacrylate) (triangle). The substrates were irradiated at the following conditions: α=60°, E=600 eV, j=8 μA/cm$^2$.

FIG. 10 shows combined LC cell viewed between a pair of crossed (a) and parallel (b) polarizers. The cell was made of rubbed Pi substrate and plasma treated PVCN substrate. The latter substrate was two-step irradiated with plasma beam in geometry 1 (FIG. 1c); in the first step the substrate was entirely irradiated at α=70°, E=600V, j=8 μA/cm$^2$, $\tau_{exp}$=2.5 min (mode 1), then in the second step at α=70°, E=600V, j—8 μA/cm$^2$, p=5 min (mode 2) through the mask. Two plasma treatment steps generate mutually perpendicular directions of LC alignment.

DETAILED DESCRIPTION OF THE INVENTION

Figure 1A:
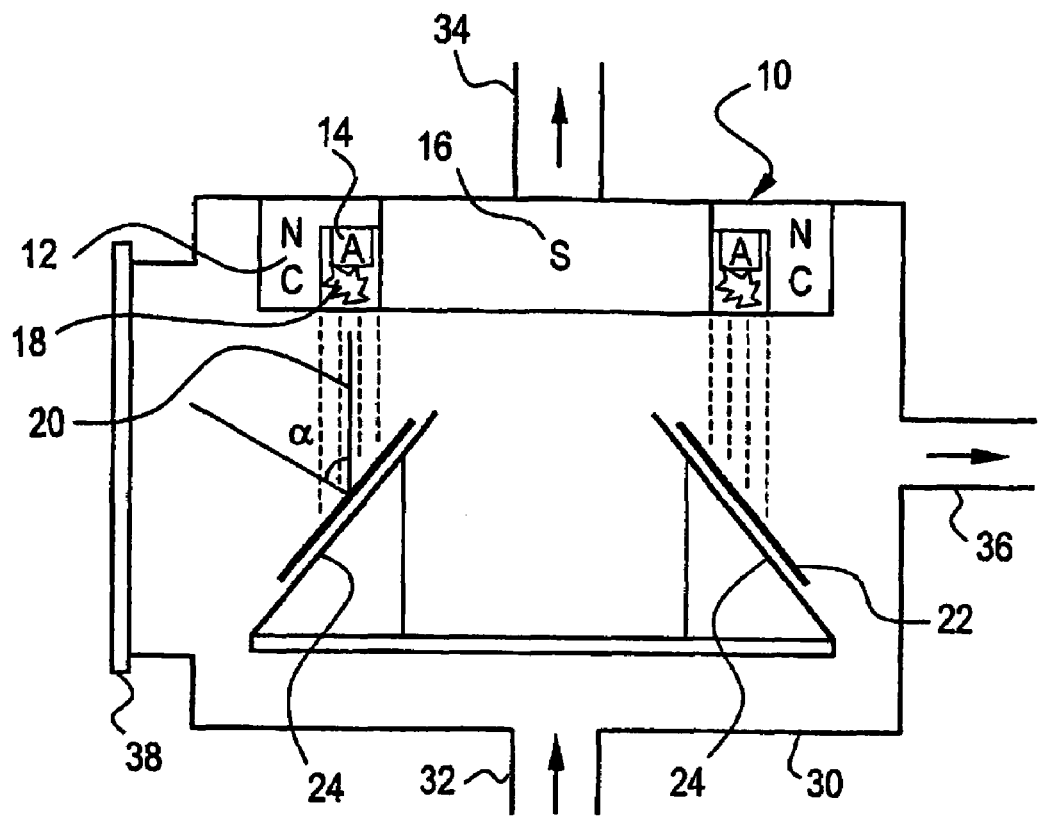
FIGS. 1*a* through 1*d* show a schematic of the plasma source, profile of the discharge channel of the plasma source, and sample positions with respect to plasma beam.
Figure 1B:
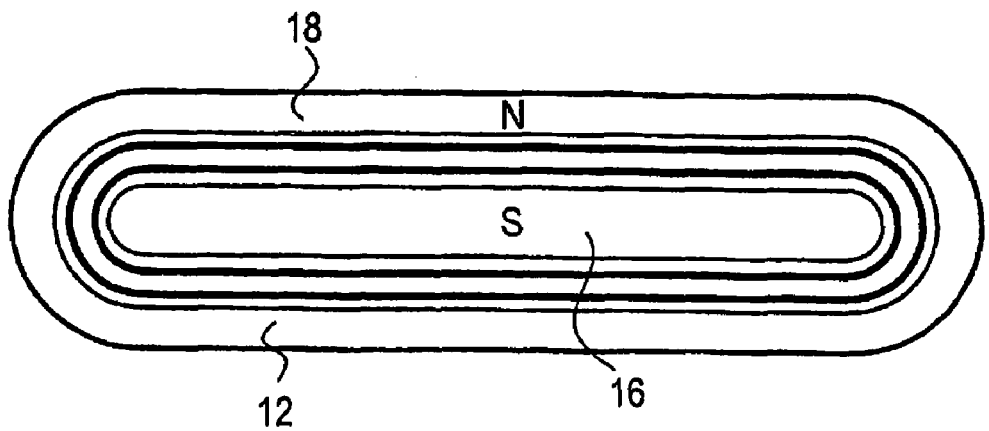

The present invention provides a method of uniform (planar, tilted and homeotropic) alignment of LCs. The method operates with collimated or partially collimated plasma beams used to treat LC aligning substrates.

The materials that can function as aligning films in the present invention, which are cross-linked, degraded, etched, or otherwise modified by the collimated or partially collimated plasma, can be of organic or non-organic origin, or a combination thereof. The class of organic aligning film materials includes, but is not limited to, photosensitive such as poly(vinyl cinnimate), or various unsaturated polyesters, and non-photosensitive polymers. Such polymers desirably have a high Tg such as at least about 100° C. and preferably at least 150° C. Suitable examples of non-photosensitive polymer aligning film materials include polyimide, various polyacrylates and methacrylates such as polymethyl methacrylate or polyethyl methacrylate, polyvinyl acetate, and the like. The class of non-organic film materials comprises, but is not limited to, glass, quartz, gold, indium tin oxide (ITO), silicon, silicon oxides ($SiO_2$, $SiO_x$), hydrogenated diamond-like carbon (DLC), and hydrogenated amorphous silicon.

The films can be deposited on the substrate by any method as known to the literature and to the art. Suitable examples of depositing the organic films are spin coating and dip coating. For spin coating and dip coating, proper solvent used should be capable of dissolving the organic material. The methods suitable for depositing the non-organic films include, but are not limited to, vapor deposition (VD) in different modifications (physical VD, chemical VD, plasma enhanced it chemical VD) ion beam sputtering, etc.

The substrate upon which the film is contained can be any material commonly used for fabricating liquid crystal cells. Materials such as glass, quartz or plastic such as polyether sulfone (PES), polycarbonate (PC), polyethylene terephthalate (PET), or triacetate cellulose (TAC) can be used. The substrate materials can also be any materials commonly used for fabricating chips, for example silicon.

To treat the aligning film, any type of plasma source producing collimated or partially collimated beam of plasma which has relatively limited divergence can be employed such as those known to the art and to the literature. In a preferred embodiment, the beam is characterized as having a full divergence angle of less than 30°. The gaseous feed used to excite plasma include, but are not limited to, Ar, Kr, He, Xe, Ne, $O_2$, $H_2$, $N_2$, $CH_4$ and $CF_4$ and mixtures thereof, with the inert gases being preferable. Conventional collimated or partially collimated plasma beams can be utilized to generate all types of uniform LC alignment described above. Closed drift thruster plasma generators are known to the art and to the literature and generally any type thereof can be used. The anode layer thruster closed drift thruster utilized in the examples of the invention was fabricated in the Department of Gaseous Electronics, Institute of Physics, Kyiv, Ukraine. Closed drift thrusters are commercially available, for instance, from Izovac of Belarus and Veeco of the United States. As a plasma source, a closed drift thruster, which is preferably an anode layer thruster specially designed to produce collimated or partially collimated plasma beams, can be used.

An example of a plasma source is illustrated in FIG. 1 in cross section and is an anode layer thruster. The plasma source 10 includes an outer cathode 12 which serves as a north pole, an anode 14, and an inner cathode 16 which serves as a south pole. In this embodiment as illustrated in FIG. 1b, the discharge channel 18 located between inner and outer cathodes 16 and 12 respectively is generally in the shape of an oval or race track. In a preferred embodiment, the straight portions of the channel are utilized to irradiate aligning substrates and are in the shape of sheet-like fluxes. The sheet like plasma fluxes produced by the anode layer sources easily treats large-area substrates (using translation method). The plasma flux 20 emanates from discharge channel 18 onto a designated portion of aligning substrate or sample 22 situated on substrate holder 24 which can be stationary or a conveyor in order to convey one or more substrates into and out of the plasma flux beam path. That is, in one embodiment, a conveyor can be utilized, moving at a predetermined rate, to convey a series of aligning substrates through the beam path formed by the plasma source, at a predetermined time of exposure whereby a number of aligning substrates can be treated in a consistent economical fashion. Vacuum chamber 30 also includes window 38 and gas valves 32, 34, and 36 which can be inlets, outlets, pumps, or combinations thereof.

The plasma source preferably is operating utilizing direct current and capable of producing a flux of plasma that is extracted and accelerated electrostatically.

The anode layer thruster generally belongs to the family of closed drift thrusters, see V. Zhurin, H. Kaufman, and R. Robinson, "Physics of closed drift thrusters", Plasma Sources Sci. Technol., 8, R1-R20 (1999). Closed drift thrusters do not have filaments or secondary electron sources to initiate discharge current or to neutralize the beam. Since the ions are accelerated electrodynamically, grids to extract and accelerate ions are not needed and are thus not present as in typical ion beam sources. The plasma source has permanent magnets at the inner and outer cathodes with the anode mounted in the space therebetween. Together the electrodes define the size and shape of the discharge channel. The ion flux is formed in crossed electric (E) and magnetic (H) fields within the discharge channel and is a part of direct current plasma generated therein.

The plasma beam from a closed drift thruster, unlike an ionic beam such as from a Kaufman ion beam source contains a number of components: ions, neutral atoms, electrons, protons, and deep UV (wavelength about less than 250 nanometers). This feature expands the aligning abilities of the technique, as not only the ions can be involved in the formation of the aligned substrates but other components too which believably modify the LC alignment. For example, the deep UV irradiation accompanying the plasma beam can be used for additional photoalignment of the treated substrate. Third, the processing with the isotropic plasma previously utilized to modify zenithal alignment by the plasma-chemical treatment of the aligning substrates (grafting, polymerization, oxidation) can be replaced by the processing with collimated or partially collimated plasma beams to control both zenithal and azimuthal alignment.

The plasma alignment technique of the present invention yields at least two different modes of alignment, with the resulting easy axis being either parallel as in the first mode or perpendicular as in the second mode to the incident plane, in contrast to the ionic beam techniques, which produce only one direction. It is also believed that additional modes can be achieved, with the zenithal angle $\theta$ between 0° and less than about 400 and the azimuth angle $\phi$ between 0° and 90°, between the first and second modes.

Homeotropic LC alignment can be generated by both oblique and normal incidence of the incidence of plasma flux. In the former case, by the change of irradiation parameters (ion density and energy, irradiation time), two various alignment modes can be obtained. First of all, these modes, differ by orientation of the induced easy axes (i.e., the direction of preferable orientation of the long axis of LC molecules): 1) a first easy axis is confined to the incident plane formed by the direction of the beam and the normal to the treated substrate; 2) a second easy axis is in the plane of film (perpendicular to the plane of incidence). By increasing the irradiation dose one can change the alignment direction from the type 1 to the type 2. For the alignment mode 1 (oblique incident of plasma flux), the value of the pretilt angle can be controlled with irradiation parameters (irradiation angle, ion current density, ion energy, etc.). The alignment mode 2 is characterized by a zero pretilt. The first and second alignment modes can be briefly described with the angles $\phi$ and $\theta$ introduced above the characterized uniform LC alignment. Assuming that azimuth angle $\phi$ is the rotational angle between projections of plasma beam and easy axis (long axis) of LC molecules on the substrate, one can summarize that, in case of the mode 1, $\phi=0°$, $\theta \geq 0°$ in particular 0° or 0.1° to about 10° or about 40°, whereas, in case of the mode 2, $\phi$=preferably about 90° or generally 70° to 110°, and $\theta$=about 0°.

The liquid crystal alignment methods of the present invention can utilize various combinations of irradiation parameters in order to obtain any of the various alignment modes. The ion current density, j, utilized in the present invention ranges generally from about 0.1 to about 1000, and preferably from about 0.5 to about 30 $\mu A/cm^2$. The ion energy, E, is utilized in a range generally from about 50 to about 5,000, desirably from about 150 to about 1000, and preferably from about 200 or about 250 to about 400 or about 600 eV. The ion energy ranges correspond to using Ar source gas and can change when other gasses are utilized. The time of exposure to irradiation generally depends on the current density and varies generally from about 5 seconds to about 30 minutes, and preferably from about 10 seconds to about 10 minutes. The pressure p in the plasma source chamber can vary in a broad range, from about $1.0 \times 10^{-5}$ to about $1.0 \times 10^{-2}$, desirably from about $1.0 \times 10^{4}$ to about $1.0 \times 10^{-3}$, preferably from about $2.0 \times 10^{-4}$ to about $10.0 \times 10^{-4}$ Torr. The plasma beam from the plasma source can be oriented with respect to the substrate surface at an angle $\alpha$ generally greater than 0°, the position normal to the substrate, to about 85°, desirably from about 10° to about 80° and preferably from about 45° to about 65°. A greater pretilt angle is achieved at around 45°, i.e., between about 30° and about 60°.

The two mode alignment feature is typical for organic and non-organic aligning layers, and it is observed for various kinds of LCs, both thermotropic and lyotropic types. That is, generally any type of liquid crystals can be utilized in the method of the present invention, with liquid crystalline phases comprising nematic, smectic, and cholesteric liquid crystals, preferably nematic crystals. The feature of two-mode alignment can be used to generate alignment with desirable parameters as well as to prepare LC cells having predetermined patterns. In one embodiment, alignment patterns can be created using masks such as paper or plastic, placed onto the target substrate which do not allow passage of the plasma beam therethrough. Masking techniques are well known to those of ordinary skill in the art.

It is an important fact that LC alignment preliminarily induced by plasma beam can be modified, or even overwritten, by subsequent plasma irradiation steps. This feature, for instance, can be used to generate pretilt angle on the substrates preliminarily treated to align LCs in mode 2. Also, the possibility to overwrite alignment reduces a number of masking processes used for cell patterning. Particularly, for two-domain alignment only one mask is required.

The plasma treatment of the present invention can override alignment induced with other methods (e.g., rubbing, photo-alignment, etc.). This means that plasma method may be successively combined with other methods for sample patterning.

The plasma treated alignment layer can be placed on one or both of the substrates in conventional liquid crystal cells. When the plasma treated layer is placed on only one of the substrates, any known alignment material may be placed on the remaining substrate. Other alignment materials include, but are not limited to, rubbed or light-irradiated polyimides, light-irradiated polyvinyl cinnimate, oblique deposited $SiO_x$.

The LC alignment on plasma treated substrates is extremely photo and thermally stable. The photo and thermal stability are comparable with those for rubbing method.

The invention will be better understood by reference to the following description and examples which to serve to illustrate, but not to the limit the scope of the present invention.

The films of photosensitive and non-photosensitive polymers were used as organic aligning films. The films were obtained by spin coating polymer solution onto substrates such as bare glass or indium tin oxide (ITO) coated glass slides.

To treat the substrates, the following set up was utilized wherein an anode layer plasma source such as an electrodynamic thruster was used which is known to the art and to the literature. The source was specially designed to produce a collimated or partially collimated flux of plasma from the argon which was used as the gaseous feed described herein. The sketch of the anode layer thruster is shown in FIG. 1a.

Figure 2:
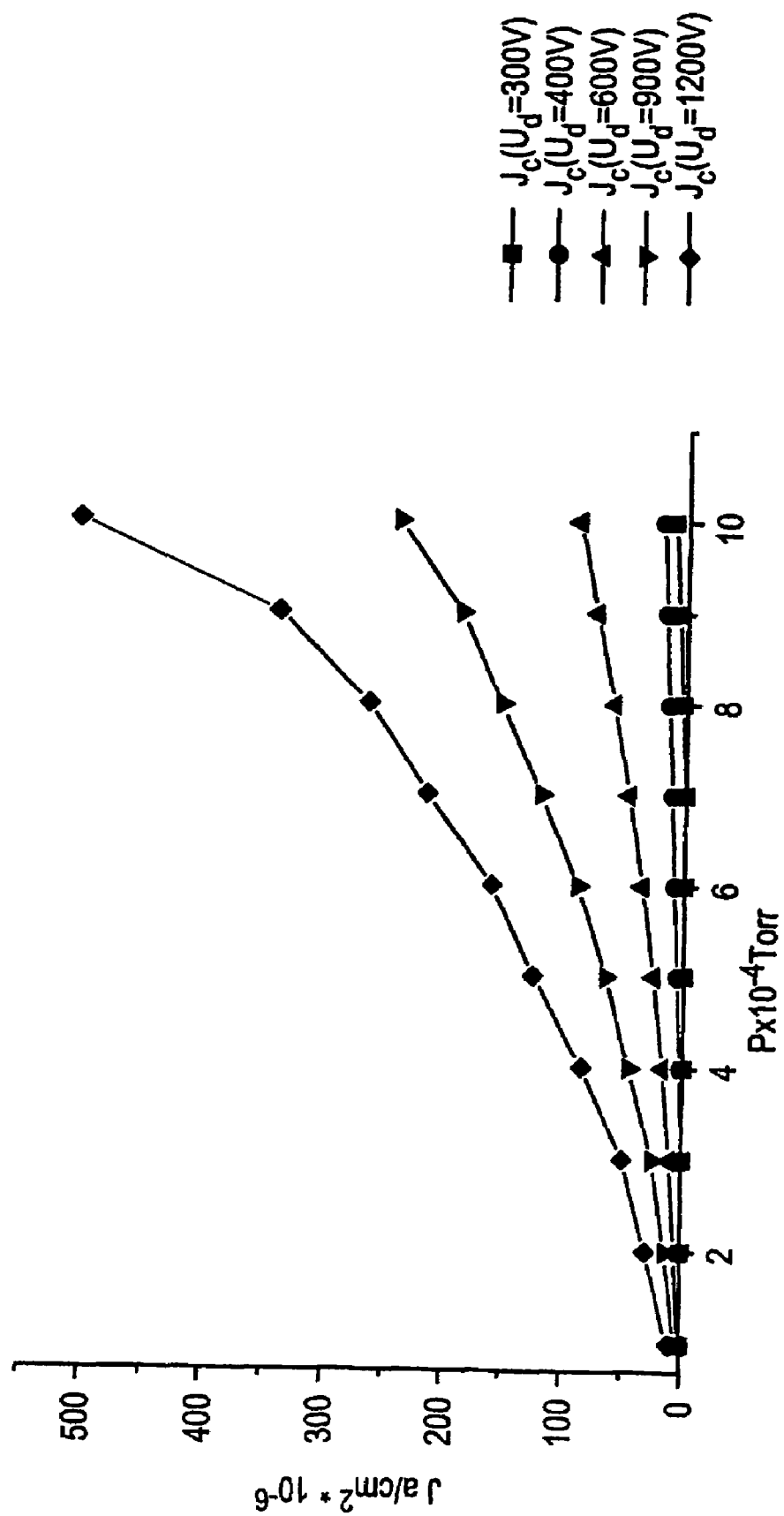
FIG. 2 shows plasma current versus gas (Ar) pressure curves for various values of ion-energy.

The anode layer thruster with the race track shape of the discharge channel (see FIG. 1b) was mounted in vacuum chamber 30 (see FIG. 1a). The channel 18 had an elongated shape to produce sheet-like plasma beams. The chamber was pumped out up to pressure $10^{-5}$ Torr, and then is filled by argon. The working pressure p in our experiments was between $2.0 \times 10^{-4}$ and $1\ 0.0 \times 10^{-4}$ Torr. The pressure of Ar determines current density j of the plasma ions $Ar^+$. The j versus p curves for various values of the anode potential U are presented in FIG. 2. The anode potential also determines ion energy E. The E was varied within 200-900 eV.

Substrate holders 24 were mounted in vacuum chamber 30 just under discharge channel 4 (FIG. 1a). The distance between plasma outlet and irradiated substrate was about 10 cm. The distance between the substrate and plasma outlet can be varied between about 5 and about 50 cm, and preferably is about 5 to about 20 cm. The holder could be rotated to perform irradiation in geometry 1 (FIG. 1c), when the substrate was tilted in the direction perpendicular to plasma sheet; and geometry 2 (FIG. 1d), when the substrate was tilted in plane of the plasma sheet. The plasma beam incidence angle CL could be varied within 0° and 85°

For evaluation of alignment of thermotropic liquid crystals, two different kinds of LC cells were prepared: In cells of the first type one substrate was irradiated by plasma beam, while the second one was a rubbed polyimide layer (combined or asymmetrical cells). In cells of the second type both substrates were irradiated by plasma beam (symmetrical cells). To get an antiparallel director configuration, the irradiation directions of the two substrates were antiparallel. The cell gap was maintained with spacers of 6 µm and 20 µm in diameter. The cells were filled with nematic LC materials of positive dielectric anisotropy $\Delta\in > 0$, such as K15 pentylcy-anobiphenyl (5CB) and ZLI 4801-000 available from Merck, or nematic LC MLC6610 with a negative dielectric anisotropy $\Delta\in < 0$, from Merck. The symmetrical cells were used to determine pretilt angle of LC by crystal rotation technique. Using combined cells, direction of LC azimuthal alignment was determined. In addition, these cells were used to estimate azimuthal anchoring energy connected with the twist angle of LC experimentally measured. To evaluate the alignment of lyotropic liquid crystals, we used cells comprised of pairs of bare glass substrates (microscope slides from Fisher Scientific). One substrate was irradiated by the plasma beam, whereas the second was non treated. The direction of alignment in these cells was determined by observation of interference colors under polarizing microscope with quartz plate.

The examples presented below illustrate abilities of the suggested technique and properties of the obtained alignment of LCs. The examples are divided into 3 groups; the first group (examples 1.1-1.17) demonstrates possibilities to generate various alignment modes, the second group (examples 2.1-2.17) is focused on control of alignment parameters (pretilt angle, anchoring energy, etc.), and the third one (example 3.1-3.3) considers the method of cell patterning.

EXAMPLE 1.1

The polyvinyl cinnimate photosensitive polymer film from Aldrich was dissolved in dichloroethane (weight concentration of 20 g/l). A droplet of this solution was deposited on a rectangular glass substrate (2×3 cm) containing ITO electrode and spin-coated for 30 seconds at 2500 rpm. Then the substrate was maintained for 2 hours at 90° C. to remove the solvent. As a result, a uniform polymer film, was produced.

Figure 1C:
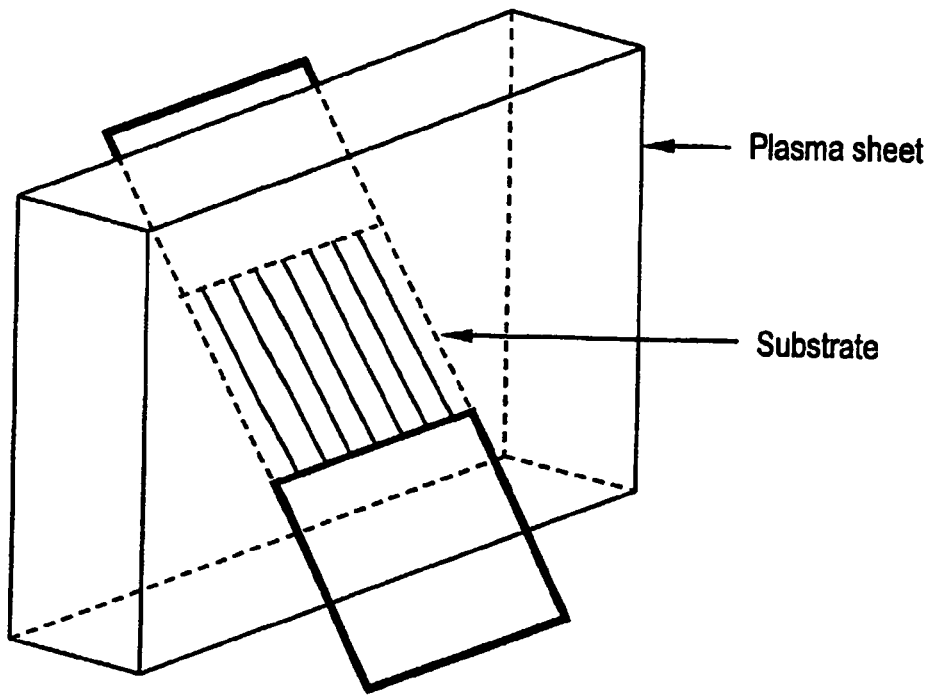
Figure 1D:
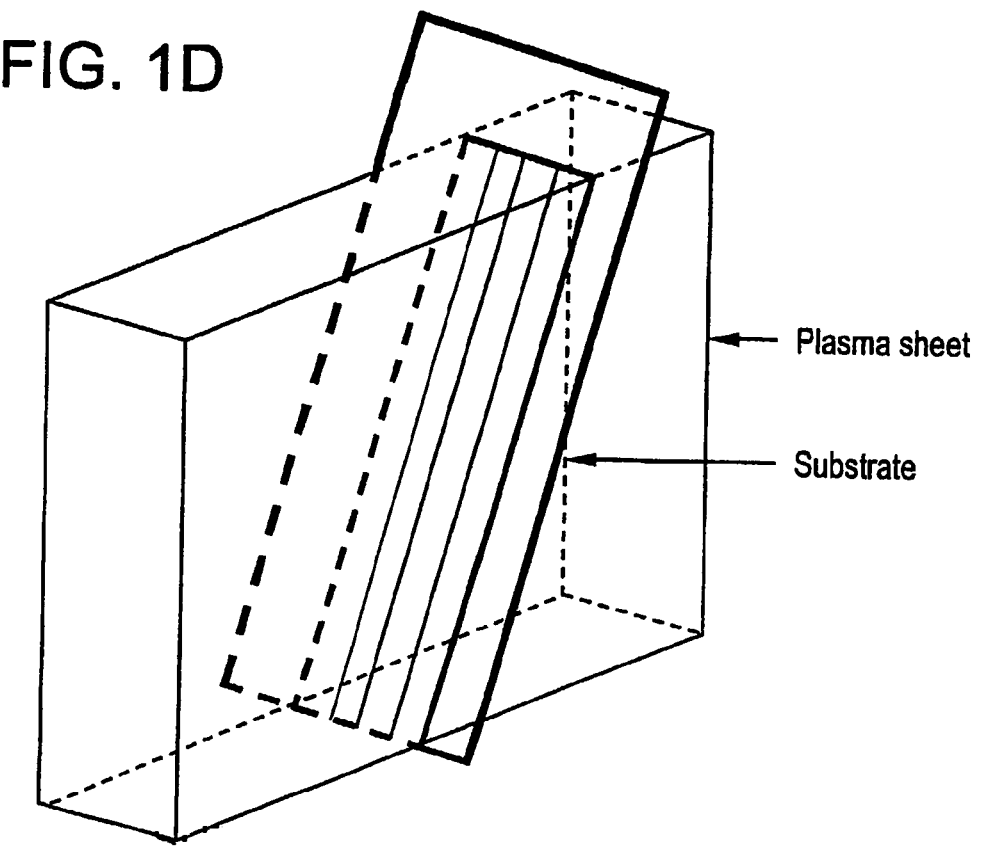

The substrate coated with PVCN (Polyvinyl cinnimate) film was subjected to plasma irradiation in geometry 1 (FIG. 1c). The irradiation parameters were as follows: plasma incidence angle α=70°, ion current density j=1 µA/cm², ion energy E=600 eV, irradiation time $\tau_{exp}$=5 min.

Figure 3A:
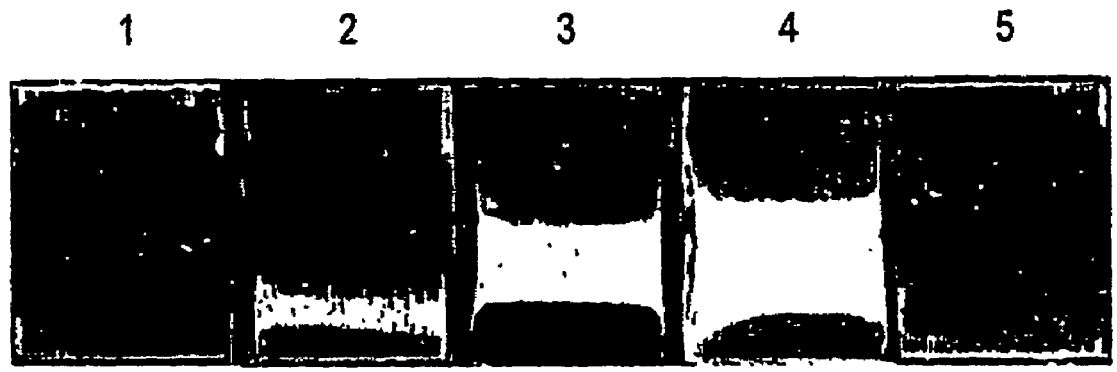
FIG. 3*a* shows photos of combined cells having rubbed polyimide substrate as a reference substrate and plasma treated PVCN (polyvinyl cinnimate) substrate as an object substrate. The object substrates were irradiated in geometry 1 (FIG. 1*c*). The plasma irradiation parameters were α=60°, E=600 eV, $\tau_{exp}$=2.5 min. The ion current density j is varied; j 1, 2, 6, 8 and 25 μA/cm² in the cells 1, 2, 3, 5, and 5, respectively. The cells were 20 μm thick. They are filled with LC K15 (4-cyano-4'-pentyl-1,1'-biphenylene). The cells were placed between pair of crossed polarizers. The pictures demonstrate alignment mode 1 in cells 1 and 5, and alignment mode 2 in the middle part of cells 2-4 corresponding to projection of the plasma beam.

The combined cells were prepared in which aligning layers were, respectively, plasma treated layer (object substrate) and rubbed polyimide layer (reference substrate). The rubbing direction corresponded to a long side of the rectangular substrate. The cell with a gap of 20 µm was prepared and filled with LC K15 of positive dielectric anisotropy $\Delta\in > 0$. The picture of this sample viewed between crossed polarizers is presented in FIG. 3a (picture 1). The dark color of the cell shows that azimuthal alignment direction on the object substrate is parallel to the rubbing direction on the reference substrate. This implies that the alignment direction on the plasma treated substrate is confined to the incidence plane of plasma beam. This type of alignment has been defined as alignment mode 1.

EXAMPLE 1.2

A combined cell is prepared as in Example 1.1 except the cells are filled with LC ZLI 4801-000 of positive dielectric anisotropy $\Delta\in > 0$. The obtained alignment of LC corresponds to alignment mode 1.

EXAMPLE 1.25

A combined cell is prepared as in Example 1.1 except the cells were filled with LC MLC6610 of negative dielectric anisotropy $\Delta\epsilon<0$. The obtained alignment of LC corresponded to alignment mode 1.

EXAMPLE 1.3

Figure 3B:
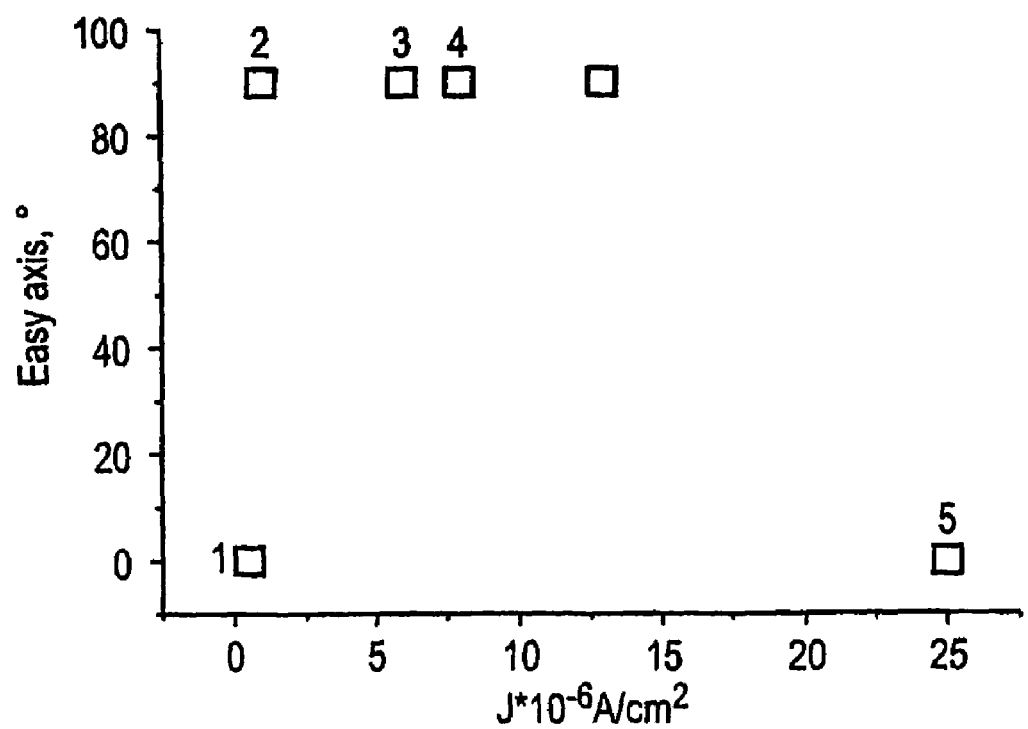

A series of combined cells (5 cells) is prepared. The cell preparation process is as in Example 1 except the value of current density j of plasma ions was varied (j=1, 2, 6, 8, 12, 25 µA/cm$^2$). The pictures of the obtained samples are presented in FIG. 3a (pictures 1, 2, 3, 4, and 5, correspondingly). The white area in the cells 2-4 corresponds to central part of the plasma beam, whereas the black areas corresponded to the peripheral part of the beam. The alignment in the black area corresponds to alignment mode 1, while the alignment in the white area corresponds to the new type of alignment. The LC easy axis in the white area is oriented perpendicularly to rubbing direction on the reference substrate. This means that the easy axis is induced perpendicularly to the plane of the plasma beam incidence. This type of alignment has been defined as alignment mode 2. The azimuth angle of the easy axis on the plasma treated substrate p (the angle between projection of plasma beam and LC easy axis on the plane of substrate) as a function of j is presented in FIG. 3b. The threshold-like transition from the mode 1 to the mode 2 is realized in the relatively narrow range of the current density of plasma ions (2 µA/cm$^2$<j<12 µA/cm$^2$).

EXAMPLE 1.4

A series of combined cells was prepared as in Example 1.1 except the object substrates were treated with plasma beam in geometry 2 (see FIG. 1c). The LC alignment results were same as in Example 1.3

EXAMPLE 1.5

A series of combined cells (8 cells) were prepared. The cell preparation process is as in Example 1.1 except that irradiation time was varied ($\tau_{exp}$=2.0, 3.0, 3.5, 4.5, 5, 6.5, 10, 15 min) and the ion current density was fixed (j=8 µA/cm$^2$). The azimuth angle (p of the LC easy axis as a function of $\tau_{exp}$ is presented in FIG. 4. As one can see, the threshold-like transition from the alignment mode 1 to the alignment mode 2 is observed in the range 4 min<$\tau_{exp}$<5 min at the indicated current density.

EXAMPLE 1.6

A series of combined cells was prepared in Example 1.5 except the object substrates are treated with plasma beam in geometry 2 (see FIG. 1c). The φ vs. $\tau_{exp}$ curve was same as in example 1.5.

EXAMPLE 1.7

A series of combined cells was prepared as in Example 1.5 except the object substrates contain polyimide (PI) aligning films. The films were prepared as follow. The 15 g/l solution of polyimide 2555 by Dupont was spin coated on the glass slides (2,500 rmp, 30 min). In the following the substrates were baked for 10 min at 90° C. and, subsequently, 2 h at 200° C. The φvs. $\tau_{exp}$ curve was same as in Example 1.5, see FIG. 4.

EXAMPLE 1.8

A series of combined cells was prepared as in Example 1.5, except the object substrates contained polymethylmethacrylate (PMMA) aligning films. The films were prepared as follow. The 10 g/l solution of PMMA by Aldrich was spin coated on the glass slides. The substrates were baked 2 h at 150° C. The dependence of the azimuth angle of the LC easy axis on the exposure time $\tau_{exp}$ is the same as in Example 1.5, see FIG. 4.

EXAMPLE 1.9

A series of combined cells was prepared as in Example 1.5 except the objection substrates contain polyethylmethacrylate (PEMA) aligning films. The films were prepared as follows. The 10 g/l solution of PS by Aldrich was spin coated on the glass slides. In the following the substrates were baked 2 h at 150° C. Same as in Example 1.5 the transition from alignment mode 1 to alignment mode 2 is observed with the increase of $\tau_{exp}$. However, compared with PVCN, PI, and PMMA, the transition is realized at higher values of $\tau_{exp}$.

EXAMPLE 1.10

A PVCN aligning film on a glass slide was prepared as in Example 1.1. The film was treated with plasma beam at the parameters corresponding to aligning mode 1: α=60°, j=8 µA/cm$^2$, E=600 eV, $\tau_{exp}$=2.5 min.

The cell is prepared as in Example 1.1, except that the substrates are combined so that 90° twist LC alignment was obtained (irradiation direction of the object substrate was perpendicular to rubbing direction of the reference substrate). The azimuth anchoring energy on the plasma treated substrate was estimated to be about 10$^{-3}$ erg/cm$^2$.

EXAMPLE 1.11

A PVCN aligning coating on a glass slide was prepared as in Example 1.1. The film was treated with plasma beam at the parameters corresponding to aligning mode 2: α=60°, j=8 µA/cm$^2$, E=600 eV, $\tau_{exp}$=2.5 min.

The cell was prepared as in Example 1.1, except that the substrates were combined so that 90° twist LC alignment was obtained (irradiation direction of the object substrate was perpendicular to rubbing direction of the reference substrate). The azimuth anchoring energy on the plasma treated substrate was estimated to be about 10$^{-3}$ erg/cm$^2$.

EXAMPLE 1.12

A bare glass substrate (microscope slide from Fisher Scientific) was irradiated in a geometry 1 (FIG. 1c) at the following conditions: α=70°, j=0.5 µA/cm$^2$, E=400 eV, $\tau_{exp}$=2.5 min. The substrate was irradiated through a mask of aluminum-foil, wherein only the central part of the substrate was exposed.

Figure 5A:
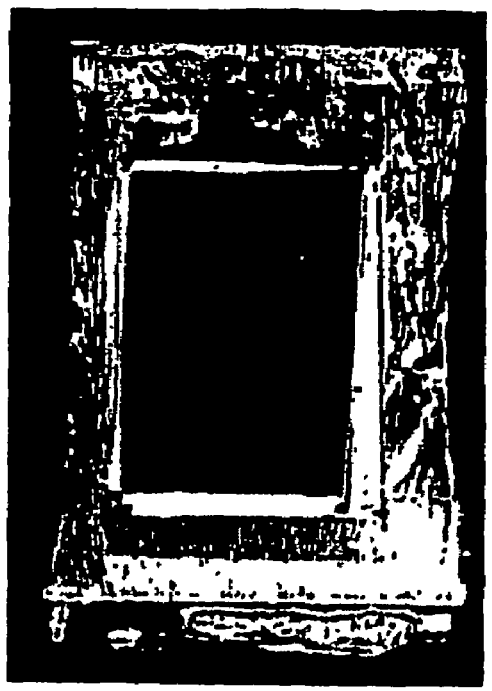
FIG. 5 presents photos taken between two crossed polarizers of two combined cells having rubbed PI substrate as a reference substrate and plasma glass slide as an object substrate. The object substrates were irradiated in geometry 1 (FIG. 1c) through the mask opening of a rectangular area in the middle of the substrate. The irradiation parameters for cell 1 and cell 2 were α=70°, E=400 eV, j=0.5 μA/cm$^2$, $\tau_{exp}$=2.5 min and α=70°, j=6 μA/cm$^2$, E=500 eV, $\tau_{exp}$=5 min, respectively. The cells were 20 μm thick. They are filled with LC K15. The cells are placed between a pair of crossed polarizers. The photos exhibit alignment mode 1 in cell (a) and alignment mode 2 in cell (b). The dark state of the oriented part of the cell (a) indicates that LC alignment on the plasma treated substrate is parallel to the alignment on the reference substrate. Analogously, bright state of the cell (b) means that LC alignment on the plasma treated substrate is perpendicular to the alignment on the reference substrate. Both cells demonstrate high quality of LC alignment.

The combined cell was prepared as in Example 1.1. The picture of this sample in crossed polarizers is presented in FIG. 5a. As can be seen, alignment mode 1 is realized in the irradiated area (black square in the middle of the cell).

EXAMPLE 1.13

The bare glass substrate (microscope slide from Fisher Scientific) was irradiated in a geometry 1 (FIG. 1c) at the following conditions: α=70°, j=6 µA/cm$^2$, E=500 eV, $\tau_{exp}$=5 min. The substrate was irradiated through the mask from aluminum foil, which opens only central part of the substrate.

Figure 5B:
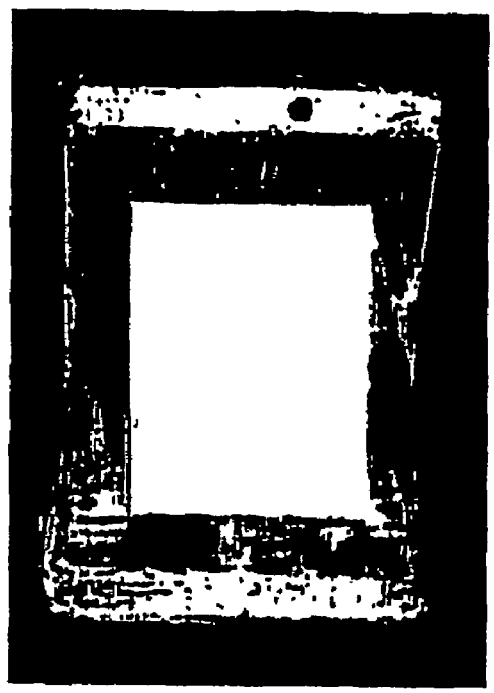

The combined cell was prepared as is described in Example 1.1. The picture of this sample in crossed polarizes was presented in FIG. 5b. The alignment mode 2 was realized in the plasma irradiated area (white square in the middle of the cell).

EXAMPLE 1.14

A combined cell was prepared as in Example 1.12, except that the object substrate was an ITO covered glass slide. Same as in Example 1.12, alignment mode 1 was realized.

EXAMPLE 1.15

A combined cell was prepared as in Example 1.13, except that the object substrate was an ITO covered glass slide. Same as in Example 1.12, alignment mode 2 was realized.

EXAMPLE 1.16

A combined cell was prepared as in Example 1.12, except that the object substrate was a bare quartz slide and the cell is filled with LC ZLI 4801-000. The alignment mode 1, same as in Example 1.11, was realized.

EXAMPLE 1.17

A combined cell was prepared as in Example 1.13, except that the object substrate was a bare quartz slide and the cell was filled with LC ZLI 4801-000. The alignment mode 2, same as in Example 1.12, was realized.

EXAMPLE 2.1

Two films of polyimide 2555 (Dupont) on glass substrates were prepared as in Example 1.7. These films were subjected to plasma irradiation in geometry 1 (FIG. 1c). The irradiation parameters were: $\alpha=60°$, $j=8$ $\mu A/cm^2$, $E=600$ eV, $\tau_{exp}=2.5$ min. Following Example 1.7, these parameters corresponded to generation of alignment mode 1.

Figure 6A:
FIG. 6 shows symmetrical cells based on plasma treated PI substrates viewed through crossed polarizers. Treatment parameters α=60°, j=8 μA/cm$^2$, E=600 eV, and $\tau_{exp}$=2.5 min correspond to alignment mode 1. The substrates are combined to obtain parallel alignment (cell a) and twist alignment (cell b). Cell gap was 20 μm.
Figure 6B:
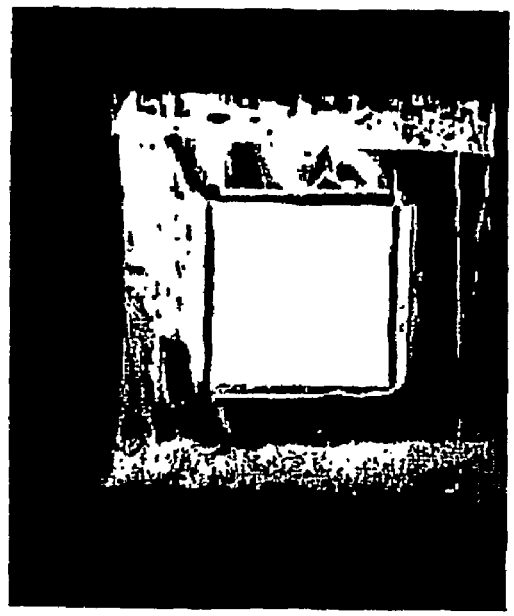

The substrates are used to prepare symmetrical cell. To get an antiparallel director configuration in the cell, the irradiation directions were antiparallel. The cell gap was 20 µm. The cell was filled with LC K15. The picture of this cell in crossed polarizers is presented in FIG. 6 (photo a). LC director was tilted towards direction of irradiation. The value of pretilt angle of the LC was determined to be 5.5°.

EXAMPLE 2.2.

A symmetric cell was prepared as in Example 2.1 except that substrates are irradiated in geometry 2 (FIG. 1c). Same as in Example 2.1, LC director was tilted towards direction of irradiation. The value of LC pretilt angle was about 5°.

EXAMPLE 2.25

A symmetric cell was prepared as in Example 2.1 and filled with LC MLC6610 with negative dielectric anisotropy $\Delta\epsilon<0$. LC director was tilted towards direction of irradiation. The value of pretilt angle of the LC was determined to be 28°.

EXAMPLE 2.3

Polyimide coated substrates were prepared and treated as in Example 2.1. A symmetrical cell with twisted director configuration was prepared. For this purpose the substrates were combined so that irradiation directions were perpendicular. The picture of this cell in crossed polarizers is presented in FIG. 6 (photo b).

EXAMPLE 2.4

Figure 7:
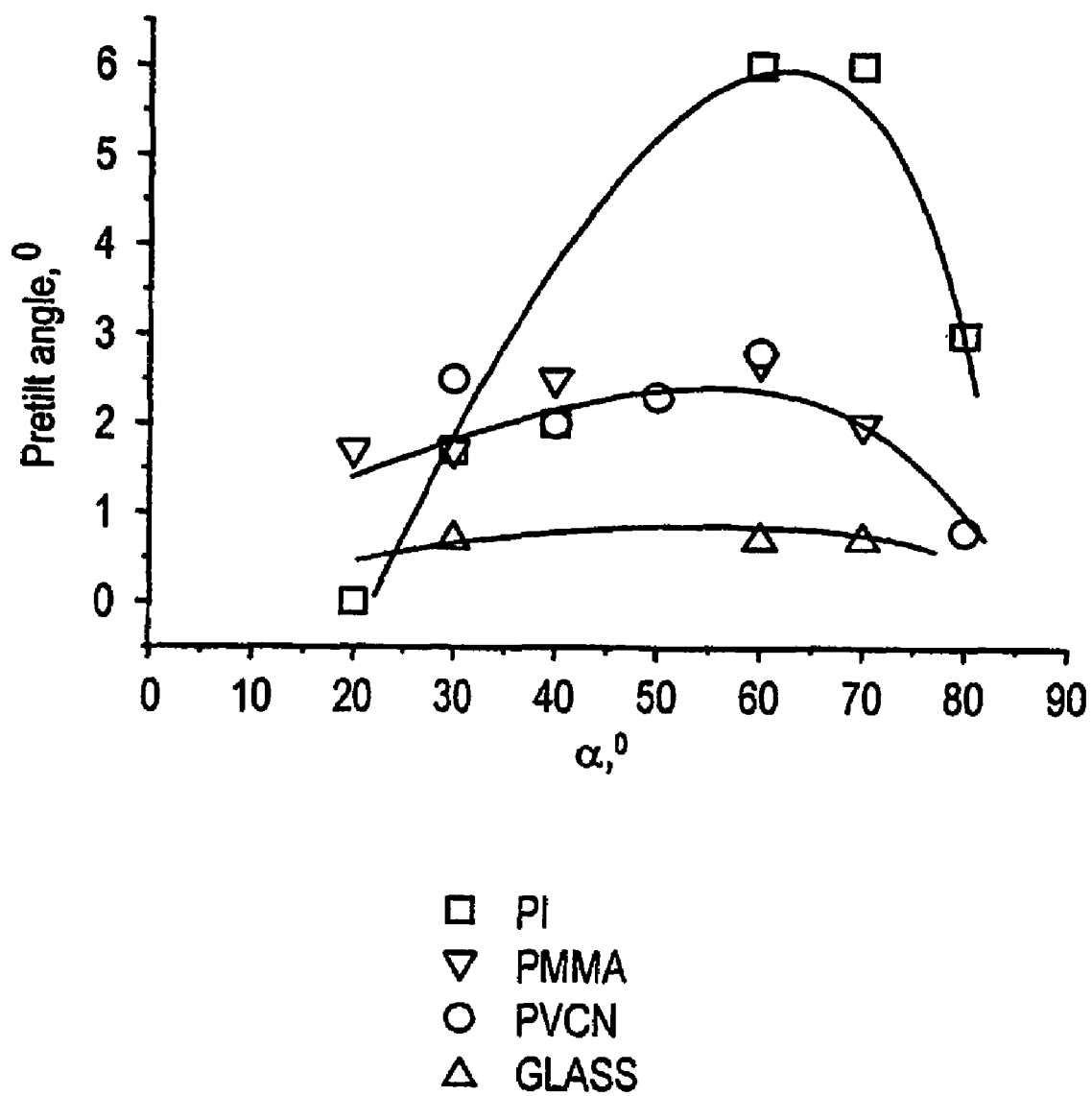
FIG. 7 shows LC pretilt angle vs. plasma incidence angle α curves for different substrates; o-PVCN, □-PI, ∇-PMMA, Δ-glass. The irradiation parameters for polymer and glass substrates were j=8 μA/cm$^2$, E=600 eV, $\tau_{exp}$=2.5 min and j=0.5 μA/cm$^2$, E=400 eV, $\tau_{exp}$=2.5 min respectively. The cells gap was 20 μm.

A series of symmetric cells was prepared as in Example 2.1, except that incidence angle was varied; $\alpha=0°$, 10°, 20°, 30°, 40°, 50°, 60°, 70°, 80°. The uniform alignment was achieved for $\beta=20°-80°$. The $\theta$ versus $\alpha$ curve is shown in FIG. 7.

EXAMPLE 2.5

A series of symmetric cells was prepared as in Example 2.4 except that aligning substrates were covered by PVCN films prepared as in Example 1.1. The uniform alignment was achieved for $\alpha=20°-80°$. The $\theta$ versus $\alpha$ curve is shown in FIG. 7.

EXAMPLE 2.6

A series of symmetric cells was prepared as in Example 2.4 except that aligning substrates were covered by PMMA films prepared as in Example 1.8. The uniform alignment was achieved for $\alpha=20°-80°$. The versus $\alpha$ curve is shown in FIG. 7.

EXAMPLE 2.7

A series of symmetric cells was prepared as in Example 2.4 except that aligning substrates were bare glass substrates (Fisher Scientific) treated as in Example 1.11, except that incidence angle was varied; $\alpha=0°$, 10°, 20°, 40°, 50°, 60°, 70°, 80°. The uniform alignment was achieved for $\alpha=30°-80°$. The $\theta$ versus $\alpha$ curve is shown in FIG. 7.

EXAMPLE 2.8

Bare glass substrates (Fisher Scientific) were treated with plasma at the following conditions: $\alpha=60°$, $j=8$ $\mu A/cm^2$, $E=600$ eV, $\tau_{exp}=5$ min. A symmetric cell is assembled as in Example 2.1. The cell was filled with LC K15. Homeotropic LC alignment in the cell was observed.

EXAMPLE 2.9

The sample was prepared as in Example 2.8, except substrates were irradiated at normal incidence of plasma beam. Homeotropic LC alignment in the cell was observed.

EXAMPLE 2.10

The sample was prepared as in Example 2.9, except the substrates were bare slides of quartz. Homeotropic LC alignment in the cell was observed.

EXAMPLE 2.11

Figure 8:
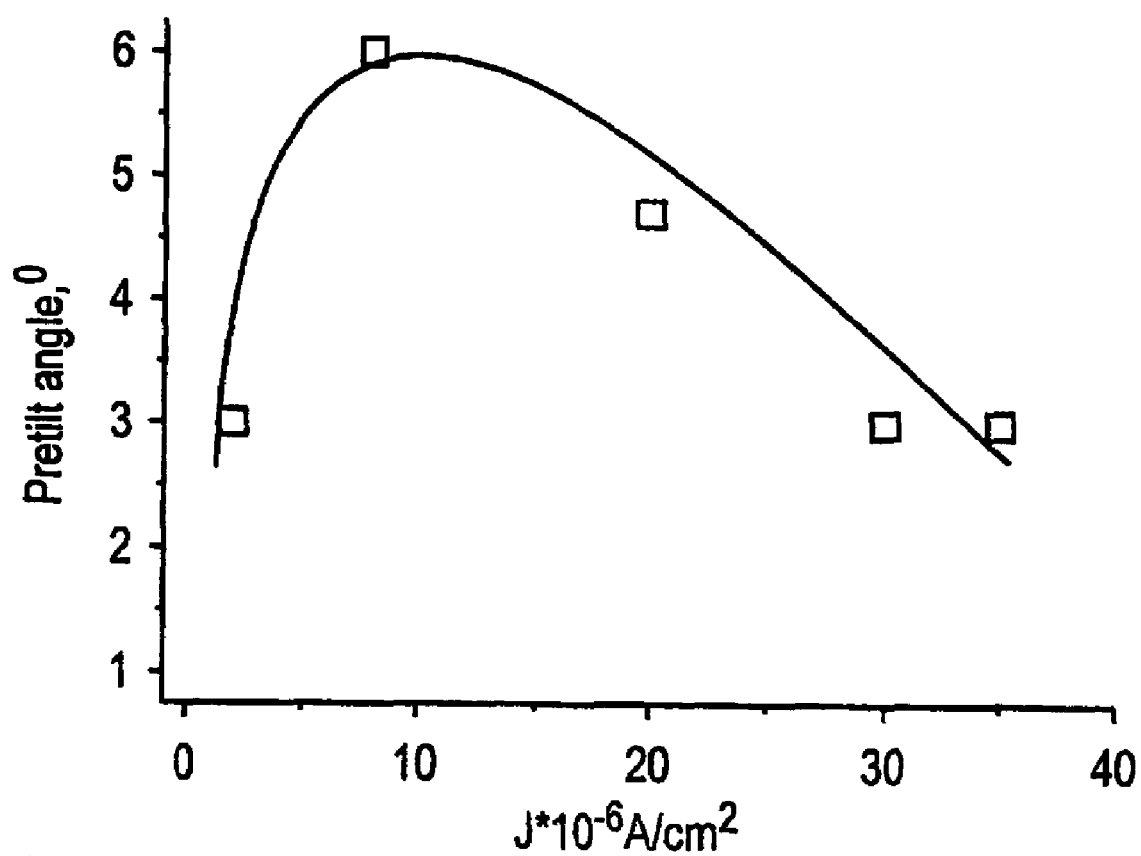
FIG. 8 shows pretilt angle as a function of ion current density for PI substrate. The substrates were irradiated at the following conditions: β=60°, E=600 eV, $\tau_{exp}$=2.5 min respectively.

A series of symmetric cells was prepared as in Example 2.1, except that ion current density j was varied; $j=2.5$, 8, 20, and 35 $\mu A/cm^2$. The $\theta$ versus j curve is shown in FIG. 8.

EXAMPLE 2.12

PVCN substrates were prepared as in Example 1.1 and treated with plasma in geometry 1 at the parameters: $\alpha=60°$, $j=8$ $\mu A/cm^2$, $E=600$ eV, $\tau_{exp}=5$ min. Following Example 1.5, the irradiation conditions correspond to the alignment mode 2. The substrates were combined so that directions of plasma irradiation were antiparallel. The thickness of the cell was 20 μm. The cell was filled with LC K15. The tilt angle of LC in the cell was about 0°.

EXAMPLE 2.13

A symmetric cell was prepared as in Example 2.11, except that substrates are combined so that directions of plasma irradiation were parallel. The tilt angle of LC K15 in the cell was about 0°.

Example 2.12 and 2.13 show that pretilt angle of LC K15 on PVCN substrates in case of alignment mode 2 is 0°.

EXAMPLE 2.14

Two symmetric cells were prepared as in Example 2.12 and Example 2.13, respectively. The cells were filled with LC ZLI 4801-000. The crystal rotation studies show that pretilt angle of LC is about 0°.

EXAMPLE 2.15

Two symmetric cells were obtained as in Example 2.12 and Example 2.13, respectively, except the substrate were irradiated in geometry 2. The crystal rotation, studies show that pretilt angle of LC is about 0°.

EXAMPLE 2.16

Two polyimide substrates were prepared as in Example 1.7. The films were irradiated at $\alpha=60°$, $j=8$ μA/cm$^2$, $E=600$ eV, $\tau_{exp}=10$ min and, subsequently, at $\alpha=60°$, $j=8$ μA/cm$^2$, $E=600$ eV, $\tau_{exp}=2$ min. After the first irradiation step the substrates were rotated so that the second direction of plasma irradiation were perpendicular to the first one. Using these substrates symmetric cell was prepared. The substrates were combined as a cell so that directions of the second plasma irradiation were antiparallel. The thickness of the cell was 20 μm. The cell was filled with LC K15. Tilted alignment of LC is observed. LC director was tilted towards direction of second irradiation. The value of pretilt angle was about 3.50.

EXAMPLE 2.17

Two polyimide films were prepared as in Example 1.7. The films were irradiated at the following conditions; (1): $\alpha=60°$, $j=8$ μA/cm$^2$, $E=600$ eV, $\tau_{exp}=2$ min, and (2) $\alpha=60°$, $j=8$ μA/cm$^2$, $E=600$ eV, $\tau_{exp}=10$ min. Using these substrates symmetric cell was prepared. By cell assembling, the substrates were combined so that directions of plasma beam incidence were antiparallel. The thickness of the cell was 20 μm. The cell was filled with LC K15. Twist alignment of LC in the cell (twist angle about 90°) was observed.

EXAMPLE 2.18

Two polyimide substrates were prepared as in Example 1.7. The films were irradiated at the following conditions: $\alpha=60°$, $j=8$ μA/cm$^2$, $E=600$ eV, $\tau_{exp}=10$ min. Using these substrates symmetric cell was prepared. By cell assembling the substrates were combined so that incidence directions of plasma beam were mutually perpendicular. The thickness of the cell was 6 μm. The cell was filled with LC K15. Twist alignment of LC in the cell (twist angle about 90°) was observed. The cell was placed between parallel polarizers and subjected to alternative electric field (sine-like signal, f=1 kHz). The transmittance versus voltage curve was presented in FIG. 9 (curve 1).

Figure 9:
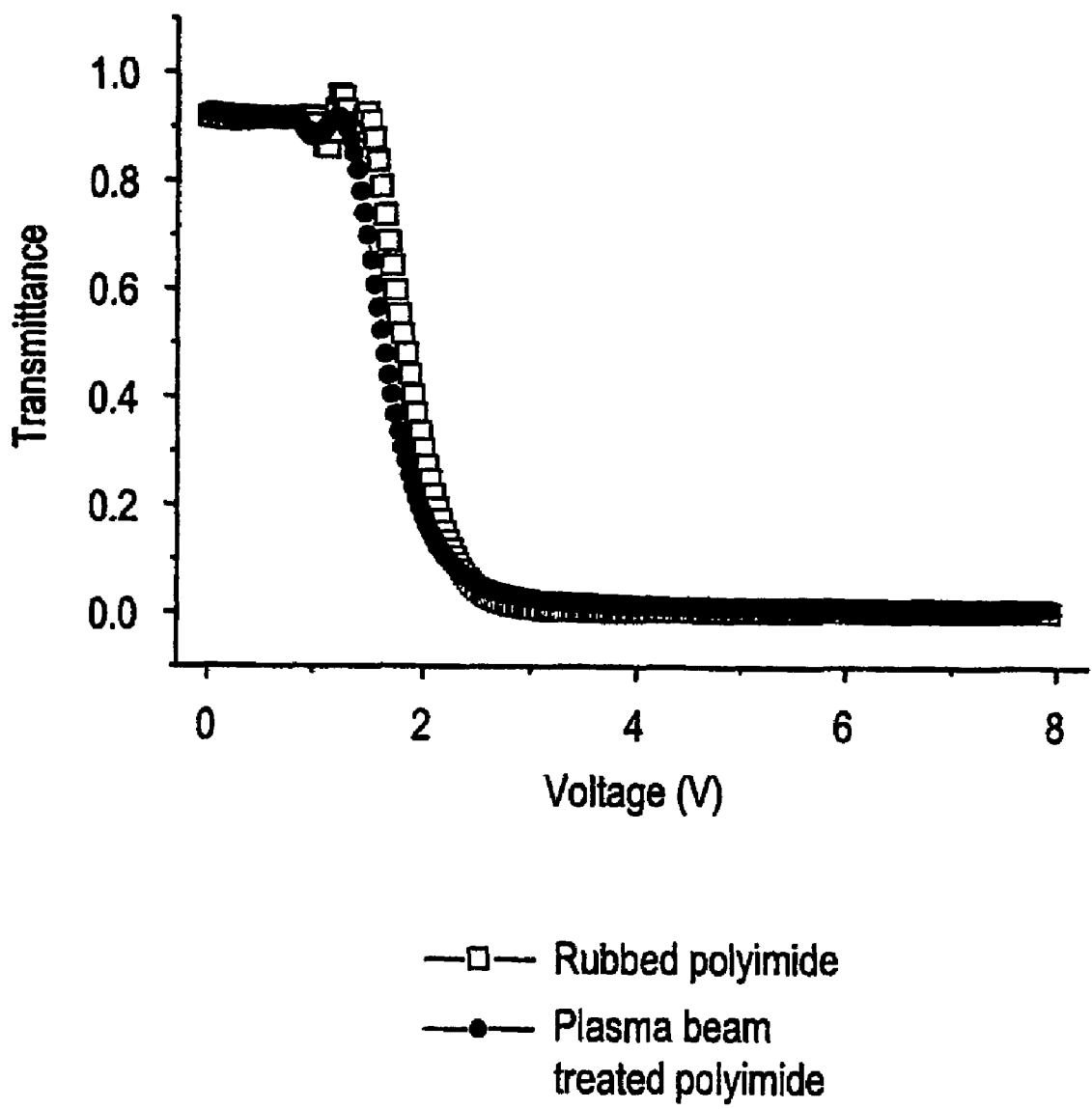
FIG. 9 demonstrates light transmission versus applied voltage curves for twist cells made of rubbed polyimide (□) and plasma beam treated polyimide (●) substrates. Plasma irradiation parameters: E=600V, J=8 μA/cm$^2$, $\tau_{exp}$=2.5 min, α=20°)$^r$. Thickness of both cells was 6+/−0.2 μm.
Figure 11A:
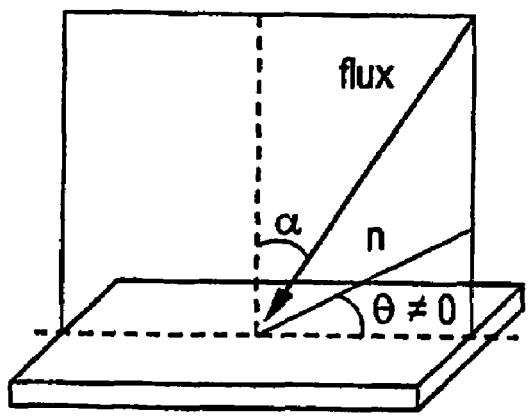
FIG. 11a illustrates the first mode of alignment of the present invention wherein the easy axis of the liquid crystal-molecules is oriented at an azimuth angle φ of 0° and the zenithal angle θ has a value between 0° and about 40°.
Figure 11B:
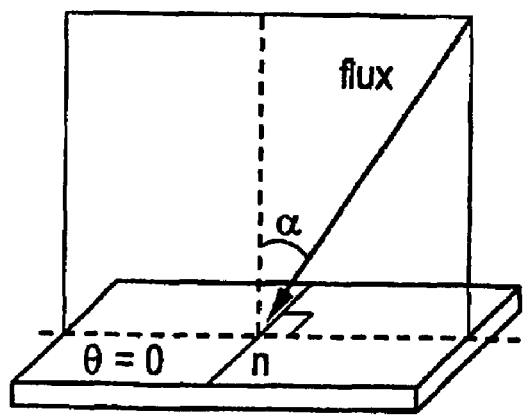
FIG. 11b illustrates the second mode of alignment wherein the easy axis of the LC molecules on the aligning substrate has an azimuth angle φ equal 90° and a zenithal angle is 0°.

Curve 2 in FIG. 9 corresponds to another cell. The cell was prepared as previous one except polyimide films are subjected to rubbing instead of plasma irradiation. Curves 1 and 2 are very similar. Thus, the cells based on plasma alignment and rubbing alignment show identical electroptic performance.

Practically all methods of the cell patterning known for photoalignment and ion beam alignment technique can be applied for the plasma beam alignment.

We consider below only several additional methods based on possibility to induce various alignment modes.

EXAMPLE 3.1

Polyvinyl cinnimate film on the glass substrate (3×2 cm) was prepared as in Example 1.1. The film was irradiated in geometry 1 at the following parameters: $\alpha=70°$, $j=8$ μA/cm$^2$, $E=600$ eV, $\tau_{exp}=2$ min. The irradiation conditions correspond to induction of the alignment mode 1. Then the film was covered with aluminum mask and irradiated again without change of the sample position. The irradiation parameters of the second irradiation are $\alpha=70°$, $j=8$ μA/cm$^2$ $E=600$ eV, $\tau_{exp}=10$ min. They correspond to alignment mode 2.

The combined cell was prepared from the said plasma treated substrate and rubbed PI substrate. Rubbing direction of the rubbed substrate was antiparallel to the plasma irradiation direction of the plasma treated substrate. The cell gap was 20 μm. The cell was filled with LC K15. The picture of this cell was shown in FIG. 10. One can see alignment domains with mutually perpendicular directions of easy axis in the azimuth plane.

EXAMPLE 3.2

The cell was prepared as in Example 3.1 except the first plasma treatment is replaced by irradiation with UV light from mercury lamp. The light polarized by Glan polarizing prism is directed normally to the substrate. The light polarization corresponds to the long side of the substrate. The light intensity and irradiation time was 12 mW/cm$^2$ and 15 min, respectively. Same as in Example 3.1, the alignment domains with mutually perpendicular directions of easy axis in the azimuth plane are observed.

EXAMPLE 4.1

To demonstrate the plasma alignment of a lyotropic LC in the alignment mode 1, we used a 14 weight % water solution of the lyotropic chromonic LC (LCLC) material disodium cromoglycate (DSCG) also known as cromolyn ($C_{23}H_{14}O_{11}Na_2$). The cells were made by using two bare glass substrates, cut from microscope slides from Fisher Scientific. One substrate was irradiated in a geometry 1 (FIG. 1c) at the following conditions: $\alpha=70°$, $j=0.5$ μA/cm$^2$, $E=400$ eV, $\tau_{exp}=2.5$ min, as in Example 1.12. The second substrate was not treated. The cell thickness was controlled by 20 micron mylar spacers. The LCLC demonstrated alignment mode 1 with the director in the incident plane with the pretilt angle close to zero. The alignment direction was determined from the birefringence colors observed under the polarizing microscope with quartz plate. Placement of the LCLC material between two untreated bare glass substrates produced a misaligned sample.

EXAMPLE 4.2

To demonstrate the plasma alignment of lyotropic LC in the mode 2, we used the same LCLC material as in Example 4.1, in the cells made of two bare glass substrates, cut from microscope slides from Fisher Scientific. One substrate was irradiated in a geometry 1 (FIG. 1c) at the following conditions: $\alpha=70°$, $j=6$ $\mu A/cm^2$, $E=500$ eV, $\tau_{exp}=5$ min, as in Example 1.13. The second substrate was not treated. The cell thickness was controlled by 20 micron mylar spacers. The LCLC demonstrated alignment mode 2 with the director perpendicular to the incident plane with a zero pretilt angle. The alignment direction was determined from the birefringence colors observed under the polarizing microscope with quartz plate. Placement of the LCLC material between two untreated bare glass substrates produced a misaligned sample.

The liquid crystals utilized are conventional and known to the art. Desirably they are nematic liquid crystals which are generally characterized by a rod-like appearance of a single component or commercially available eutectic mixture. Alternatively, ferroelectric liquid crystals can be utilized such as those optically-active single components, exhibiting a smectic C phase with tilted layer structure.

In accordance with the patent statutes, the best mode and preferred embodiment have been set forth, the scope of the invention is not limited thereto, but rather by the scope of the attached claims.

What is claimed is:

1. A process for preparing an aligning substrate for liquid crystals, comprising the steps of:
   providing an aligning substrate comprising an aligning film; and
   bombarding at least a portion of the substrate with a plasma beam from a plasma beam source at an incident angle of greater than 0° to about 85° thereby inducing a surface anisotropy and producing an alignment direction on the bombarded portion of the aligning substrate, wherein 0° is a position of the beam normal to the substrate, wherein an azimuth angle has a reference axis that is a projection of the plasma beam on the aligning substrate in the first bombarding step and a zenithal angle is an angle between the alignment direction and the aligning substrate, wherein
   i) the plasma beam bombarded portion of the aligning substrate imparts to a liquid crystal the alignment direction having an azimuth angle $\phi$ of 70° to 110° and a zenithal angle $\theta$ of about 0°; and
   ii) the plasma beam bombardment includes a second bombarding step and after the first bombarding step wherein the substrate or plasma source is rotated so that in the second bombarding step, the direction of plasma irradiation is perpendicular to irradiation of the first bombarding step, wherein the bombarded portion of the alignment substrate imparts to a liquid crystal the alignment direction having an azimuth angle $\phi$ of 90° and a zenithal angle $\theta$ of 0° to 5°.

2. The process according to claim 1, wherein the plasma beam source is a closed drift thruster.

3. The process according to claim 2, wherein current density of the plasma beam is about 0.1 to about 1000 $\mu A/cm^2$, and wherein the ion energy is from about 100 to about 5000 eV.

4. The process according to claim 3, wherein said closed drift thruster is an anode layer thruster.

5. The process according to claim 3, wherein the aligning film comprises polyvinyl cinnamate, unsaturated polyester, polyimide, poly(meth)acrylate, polyvinyl acetate, glass, quartz, gold, indium tin oxide, silicon, silicon oxide, hydrogenated diamond-like carbon, or hydrogenated amorphous silicon.

6. The process according to claim 5, wherein in the i) alignment direction the azimuth angle $\phi$ is about 90°.

7. The process according to claim 5, wherein current density of the plasma beam is about 0.5 to about 30 $\mu A/cm^2$, and wherein the ion energy is from about 200 to about 700 eV.

8. The process according to claim 3, wherein the incident angle is about 20° to about 85°.

9. The process according to claim 8, wherein the incident angle is about 50° to about 75°.

10. The process according to claim 2, further including a step of forming a liquid crystal cell comprising the aligning substrate and thermotropic or lyotropic liquid crystals.

11. The process according to claim 3, further including a step of forming a liquid crystal cell comprising the aligning substrate and thermotropic or lyotropic liquid crystals.

12. The process according to claim 2, further including a step of placing a mask onto the substrate prior to said bombarding to prevent the plasma beam from reaching a predetermined portion of the aligning substrate.

13. The process according to claim 5, further including a step of placing a mask onto the substrate prior to said bombarding to prevent the plasma beam from reaching a predetermined portion of the aligning substrate.

14. The process according to claim 2, wherein the plasma beam is in the form of a sheet.

15. The process according to claim 5, wherein the plasma beam is in the form of a sheet.

16. The process according to claim 2, further including the step of moving the aligning substrate through a path of the plasma beam.

17. The process according to claim 3, further including the step of moving the aligning substrate through a path of the plasma beam.

18. The process according to claim 5, further including the step of moving the aligning substrate through a path of the plasma beam.

19. The process according to claim 1, wherein the aligning substrate is positioned at a distance of about 5 to about 50 cm from the plasma beam source.

20. The process according to claim 3, wherein the aligning substrate is positioned at a distance of about 5 to about 50 cm from the plasma beam source.

21. The process according to claim 5, wherein the aligning substrate is positioned at a distance of about 5 to about 50 cm from the plasma beam source.

22. A process for preparing an aligning substrate for liquid crystals, comprising the steps of:
   providing an aligning substrate comprising an aligning film; and
   bombarding at least a portion of the substrate with a plasma beam from a plasma beam source at an incident angle of greater than 0° to about 85° thereby inducing a surface anisotropy and an alignment direction on the aligning substrate on the area of the aligning substrate bombarded by the plasma beam, wherein 0° is a position normal to the substrate, wherein current density of the plasma beam is about 0.5 to about 30 $\mu A/cm^2$, wherein the ion energy is from about 200 to about 700 eV, wherein the aligning film comprises polyvinyl cinnamate, unsaturated polyester, polyimide, poly(meth)acrylate, polyvinyl acetate, glass, quartz, gold, indium tin oxide, silicon, silicon oxide, hydrogenated diamond-like carbon, or hydrogenated amorphous silicon, wherein the plasma beam source is a closed drift thruster, wherein an azimuth angle has a reference axis that is a projection of the plasma beam on the aligning substrate in the first bombarding step and a zenithal angle is an angle between the alignment direction and the aligning substrate, wherein
   i) the plasma beam bombarded portion of the aligning substrate imparts to a liquid crystal the alignment direction having an azimuth angle $\phi$ of 70 to 110° and a zenithal angle $\theta$ of about 0°; and
   ii) the plasma beam bombardment includes a second bombarding step and after the first bombarding step, wherein the substrate or plasma source is rotated so that in the second bombarding step, the direction of plasma irradiation is perpendicular to the irradiation of the first bombarding step, wherein the bombarded portion of the alignment substrate imparts to a liquid crystal the alignment direction having an azimuth angle $\phi$ of 90° and a zenithal angle $\theta$ of 0° to 5°.

23. The process according to claim 22, wherein said closed drift thruster is an anode layer thruster.

24. The process according to claim 22, wherein in the i) alignment direction the azimuth angle $\phi$ is about 90°.

25. The process according to claim 22, wherein the incident angle is about 20° to about 85°.

26. The process according to claim 25, wherein the incident angle is about 50° to about 75°.

27. The process according to claim 22, further including a step of forming a liquid crystal cell comprising the aligning substrate and thermotropic or lyotripic liquid crystals.

28. The process according to claim 22, further including a step of placing a mask onto the substrate prior to said bombarding to prevent the plasma beam from reaching a predetermined portion of the aligning substrate.

29. The process according to claim 22, wherein the plasma beam is in the form of a sheet.

30. The process according to claim 22, further including the step of moving the aligning substrate through a path of the plasma beam.

31. The process according to claim 22, wherein the aligning substrate is positioned at a distance of about 5 to about 50 cm from the plasma beam source.

32. The process according to claim 1, wherein the plasma beam bombarding provides the alignment direction i), and wherein the liquid crystals are thermotropic or lyotropic liquid crystals.

33. The process according to claim 1, wherein the plasma beam bombarding provides the alignment direction ii), and wherein the liquid crystals are thermotropic or lyotropic liquid crystals.

34. The process according to claim 22, wherein the plasma beam bombarding provides the alignment direction i), and wherein the liquid crystals are thermotropic or lyotropic liquid crystals.

35. The process according to claim 22, wherein the plasma beam bombarding provides the alignment direction ii), and wherein the liquid crystals are thermotropic or lyotropic liquid crystals.

* * * * *

UNITED STATES PATENT AND TRADEMARK OFFICE
CERTIFICATE OF CORRECTION

PATENT NO. : 7,714,965 B2 Page 1 of 1
APPLICATION NO. : 10/553326
DATED : May 11, 2010
INVENTOR(S) : Liang-Chy Chien et al.

It is certified that error appears in the above-identified patent and that said Letters Patent is hereby corrected as shown below:

IN THE CLAIMS:

In Claim 1, column 17, line 47, please replace "and" with --or--.

In Claim 22, column 19, line 9, please replace "and" with --or--.

Signed and Sealed this

Twenty-second Day of June, 2010

David J. Kappos
*Director of the United States Patent and Trademark Office*